United States Patent
Espinoza-Ibarra et al.

(10) Patent No.: US 8,474,969 B2
(45) Date of Patent: Jul. 2, 2013

(54) SYSTEM AND METHOD OF INK AND DATA DELIVERY

(75) Inventors: Ricardo Ernesto Espinoza-Ibarra, San Diego, CA (US); Ben Percer, Murrieta, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 364 days.

(21) Appl. No.: 12/679,420

(22) PCT Filed: Oct. 12, 2007

(86) PCT No.: PCT/US2007/081315
§ 371 (c)(1),
(2), (4) Date: Mar. 22, 2010

(87) PCT Pub. No.: WO2009/048477
PCT Pub. Date: Apr. 16, 2009

(65) Prior Publication Data
US 2010/0231619 A1    Sep. 16, 2010

(51) Int. Cl.
*B41J 2/01* (2006.01)

(52) U.S. Cl.
USPC .................. 347/104; 347/50; 347/5

(58) Field of Classification Search
USPC ........ 347/86, 104, 5, 9, 50; 385/115; 359/124
See application file for complete search history.

(56) References Cited

U.S. PATENT DOCUMENTS

| | | | |
|---|---|---|---|
| 6,024,441 A | 2/2000 | Nishimoto | |
| 7,881,577 B1* | 2/2011 | Slack et al. | 385/115 |
| 2002/0067525 A1* | 6/2002 | Sakamoto et al. | 359/124 |
| 2002/0080218 A1* | 6/2002 | Kaga et al. | 347/104 |

FOREIGN PATENT DOCUMENTS

| | | |
|---|---|---|
| DE | 3442583 A1 | 5/1986 |
| EP | 1450093 A1 | 8/2004 |

OTHER PUBLICATIONS

International Searching Authority, ISA 220 ISR & Written Opinion, Jul. 18, 2008, 11 pgs., European Patent Office.

* cited by examiner

*Primary Examiner* — Lam S Nguyen

(57) ABSTRACT

A system (100, 500, 600, 800) of ink and multi-channel data delivery includes an optically transmissive tubular body (113) having at least two ends (105, 107). The tubular body (113) defines an ink channel between an ink supply (101) and at least one inkjet pen (117, 521, 525, 529, 901, 903). A multi-channel optical transmitter (111, 300, 400) is in optical communication with one end (105, 107) of the tubular body (113), and an optical receiver (115, 509, 511, 513) is in optical communication with another end (105, 107) of the tubular body (113).

18 Claims, 10 Drawing Sheets

SYSTEM AND METHOD OF INK AND DATA DELIVERY

BACKGROUND

Ink tubes are used in many printing devices, including thermal inkjet printers, piezoelectric inkjet printers, and other printing devices. Typically, these printing devices maintain a reserve of liquid ink in a reservoir. Ink tubes are used to transport the ink from the reservoir to the printing device's printhead or pens. The printhead, including individual pens, selectively deposits the ink onto a medium to create printed text and images. In most cases, ink tubes are made out of a flexible plastic material that allows for a substantially nonlinear path between the ink reservoir and the printhead.

Electronic control signals are generally transmitted from control circuitry in the printing device to electrical components in the inkjet pens. The control signals affect the operation of individual inkjet pens, such as when ink is selectively released from the pens onto print media. Wires or cables are generally used to electrically connect the control circuitry to the related components in the inkjet pens.

Additionally, some printing devices include diagnostic system components designed to aid service personnel in identifying faulty components. In some inkjet printers, for example, optical indicators such as light emitting diodes (LEDs) are used to indicate faulty inkjet pens.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
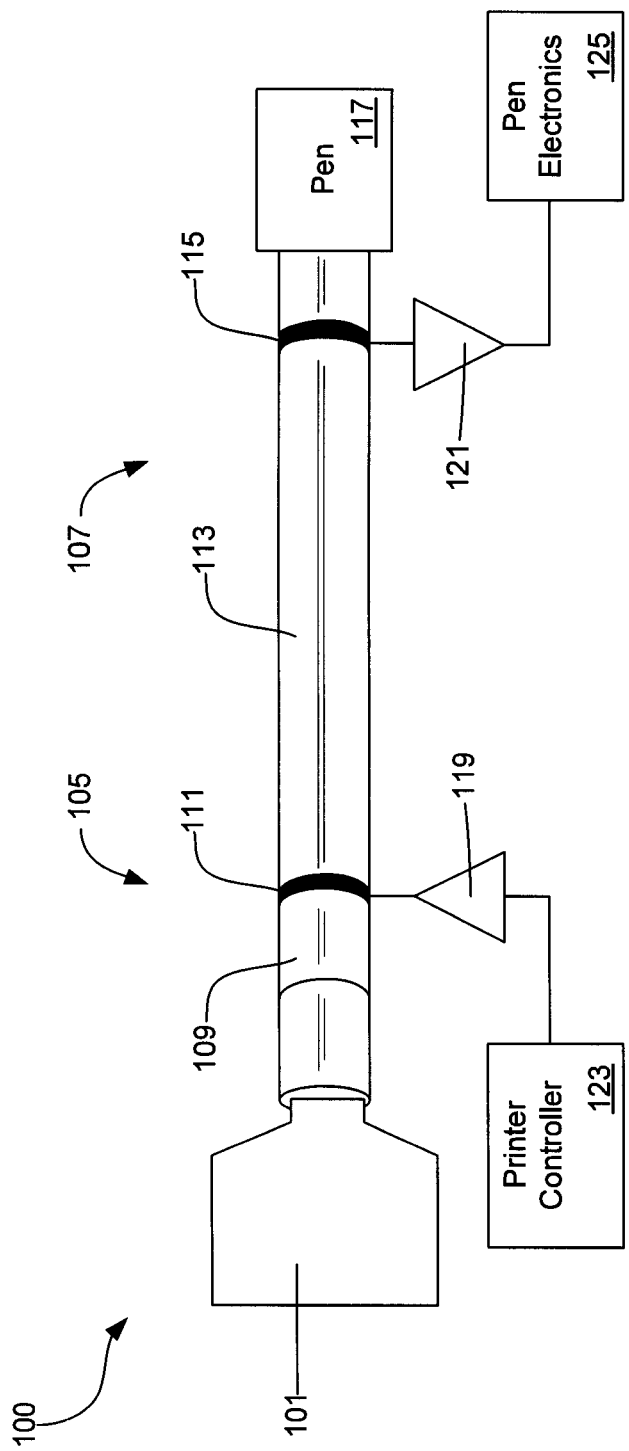
FIG. 1 is a diagram of an illustrative embodiment of a system of ink and data delivery, according to principles described herein.

As used in the present specification and in the appended claims, the term "inkjet pen" refers broadly to a device configured to selectively deposit liquid ink onto a print medium in accordance with control signals received by the inkjet pen. Inkjet pens may comprise a variety of different components to actuate the controlled deposition of ink drops. For example, inkjet pens include, but are not limited to, piezo-electric inkjet pens, thermal inkjet pens and others.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims, the term "optical source" refers to a device from which optical energy originates. Examples of optical sources as thus defined include, but are not limited to, light emitting diodes, lasers, light bulbs, and lamps.

As used in the present specification and in the appended claims, the term "optical transmitter" refers broadly to a device configured to transmit data, such as digital bits or analog signals, using one or more optical sources. In some cases, optical transmitters as thus defined modulate the data onto light beams originating from the optical source(s) by varying specific characteristics of the light beams, such as beam intensity, wavelength, or duration of beam pulse.

As mentioned above, ink tubes and electrical wires or cables are often used in printing devices to transport ink and data, respectively, to inkjet pens. The inkjet pens may then selectively deposit the ink onto a print medium according to control data received via the electrical wires or cables. However, it may be desirable to reduce the number of physical components present in the printing system that are used to transport data and ink to the inkjet pen. Particularly, it may be desirable to provide an ink transportation system having integrated data transmission capabilities. A reduced number of components may lower the cost of fabricating the printing device and free up space within the printing device.

As also mentioned above, some printing devices include diagnostic system components designed to aid service personnel in identifying faulty components. In some inkjet printers, for example, optical indicators such as light emitting diodes (LED) are used to indicate faulty inkjet pens. If internal systems determine that a particular inkjet pen is malfunctioning, a signal is sent to light an LED disposed on that inkjet pen. Consequently, when a service technician accesses the interior of the printing system to repair or replace the malfunctioning pen, the malfunctioning pen is immediately identified by the lit LED, and the technician can immediately begin work on the malfunctioning pen.

While this arrangement is very helpful in identifying for the technician which pen needs service, it may be desirable to provide a system of displaying an optical service indicator on specific inkjet pens without requiring the presence of discrete LEDs and their associated real estate on the pens. Furthermore, it may also be desirable to reduce electromagnetic interference concerns, electrostatic discharge concerns, and concerns associated with differential ground shifts between electronics at each on opposite ends of an ink tube.

Consequently, the present specification discloses systems of ink and multi-channel data delivery in which data is transmitted optically over a plurality of channels to an inkjet pen through an optically conductive tubular body. The same tubular body may also serve to provide a flow of ink to the inkjet pen.

Additionally, the present specification discloses a system of visual diagnostic indicators for an inkjet pen. The system includes a tubular body having first and second ends. An optical source is in optical communication with one of the ends, and the other end is in optical communication with a visual indicator or optical illuminator on the inkjet pen. Light from the optical source is transmitted through the tubular body and lights the visual indicator on the inkjet pen when needed to indicate, for example, a detected malfunction in that particular inkjet pen.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods.

Illustrative Systems

Referring now to FIG. 1, a diagram of an illustrative system (100) of ink and multi-channel data delivery in a printing device is shown. The illustrative system (100) includes a tubular body (113) having first and second ends (105, 107). The tubular body (113) is configured to transport liquid ink from an ink supply (101) to an inkjet pen (117), where the ink may then be selectively applied to a print medium by the pen (117). The tubular body (113) is coupled to an in-line ink pump (109) and an optical transmitter (111) at the first end. At the second end (107), the tubular body (113) includes an optical receiver (115) and is coupled to the inkjet pen (117).

The in-line ink pump (109) is coupled to the ink supply (101) and is configured to mechanically force liquid ink from the ink supply (101) into the first end of tubular body (113) where the ink is provided under pressure to the inkjet pen (117) at the second end (107) of the tubular body (113).

The tubular body (113) may be fabricated from a flexible material having optical properties that enable the transmission of light through the material of the sidewall of the tubular body (113) without significant loss of energy. Upon entering this material that composes the tubular body (113), the index of refraction of the material is such that, in some embodiments, substantially total internal reflection of the beam occurs, thus enabling the transmission of the optical beam along the length of the tubular body (113) with minimal losses. In other embodiments, the tubular body (113) may be lossy for certain types of signaling, given the relatively short distances of transmission. Even if the amplitude of the transmitted optical signal is significantly reduced when it reaches the optical receiver (115), as long as the receiver can detect the signal, the output of the receiver (115) may be amplified to the appropriate level. Many plastic materials having these optical properties, such an appropriate index of refraction, are available in the art. Additionally, custom plastics or other materials having desirable optical characteristics for use in the tubular body (113) may be used in some embodiments.

Because transmitted optical beams are confined within the material of the tubular body (113), the tubular body (113) may be flexed or positioned as needed according to the physical and spatial characteristics of the printing device. A linear or "line of sight" configuration between the optical transmitter (111) and the optical receiver (115) is not needed to ensure data transmission. Additionally, concerns stemming from electromagnetic interference, electrostatic discharge, and differential ground shifts between electronics at each end of the tubular body (113) are virtually eliminated by transmitting data optically through the tubular body (113), as opposed to electrically.

The tubular body (113) is configured to transmit multiple data channels across its length. The data channels may be transmitted together as distinct beams of optical energy, each of the beams having a characteristic wavelength that is separate and distinct from the characteristic wavelengths of other optical beams that are transmitted in the tubular body (113). Each of the separate optical beams may be modulated with different data. In some embodiments, the multiple channels of data transmitted through the tubular body (113) may be used for the purpose of increasing bandwidth or data integrity, with each of the data channels intended for the same destination. In other embodiments, separate data channels may be intended for separate destinations, such as different inkjet pens, and take advantage of a common optical transmission medium in the tubular body (113).

The optical transmitter (111) in the system (100) is configured to transmit multiple channels of optical data into the tubular body (113) which conducts the optical data along its length to the optical receiver (115). In some embodiments, the optical transmitter (111) is a ring-shaped structure having substantially the same cross-sectional shape and size as the tubular body (113). The optical transmitter may include one or more optical sources, such as LEDs, vertical cavity surface emitting lasers (VCSELs), other lasers, from which the optical beams bearing the data originate.

In some embodiments, the optical transmitter (111) may include a plurality of optical sources, each source being configured to transmit an optical beam of a different characteristic wavelength. By transmitting data from each of the optical sources through the tubular body (113), multiple channels of data may be transmitted through the tubular body (113). In other embodiments, the optical transmitter (111) may include one or more optical sources that are configured to selectively alter the characteristic wavelength of optical beams originating from the sources, thus allowing the sources to transmit optical energy at one characteristic wavelength at a given time, and switch to a separate characteristic wavelength at another time.

The optical transmitter (111) is in communication with a modulator element (119) configured to encode digital or analog data onto the one or more optical beams emitted by the optical source(s). The modulator element (119) is configured to provide a control signal to the optical transmitter (111) that affects the emission of the one or more optical beams by the optical transmitter (111) in addition to the characteristics of the beam(s). The modulator element (119) may encode data onto the beam(s) by selectively altering a property of the optical beams according to the data to be encoded. For example, the intensity, duration, and/or frequency of the optical beams may be dynamically altered by the modulator element (119) to encode data into the optical beam.

The optical receiver (115) in the system (100) is configured to receive multiple channels of optical data from the tubular body (113). Like the optical transmitter (111), the optical receiver (115) may, in some embodiments, be a ring-shaped structure with substantially the same cross-sectional area and size as the tubular body (113). The optical receiver (115) includes at least one sensor configured to detect optical energy transmitted through the tubular body (113). In some embodiments, the optical receiver may include a plurality of optical sensors, with individual sensors being configured to detect optical energy having a specific characteristic wavelength or ranges of wavelengths. In other embodiments, the optical receiver may have one or more optical sensors or detectors that are configured to receive optical beams of different wavelengths at different times.

The sensors in the optical receiver (115) are configured to output an electronic signal representative of the optical beams received through the tubular body (113). Examples of suitable optical sensors that may be included in the optical receiver include photodiodes, light-sensitive semiconductors, and photodetectors. An optical sensor may be tuned to detect a certain wavelength or range of wavelengths of light using filtering techniques. In this way, multiple optical beams having different characteristic wavelengths may be transmitted together through the tubular body (113) and separately detected by the optical receiver (115).

The optical receiver (115) is in communication with a demodulator element (121) that is configured to extract the encoded data from the electrical signal output by the detectors in the optical receiver (115). In some embodiments, separate channels of data may be extracted from separate optical beams by the demodulator element (121). In other embodiments, multiple modulator elements (119) may be used in conjunction with corresponding multiple demodulator elements (121) to transmit the data across the tubular body (113).

In the system (100) shown, pen control signals are produced by printer controller circuitry (123) to control the operation of the inkjet pen (117). These pen control signals may be in the form of digital or analog data that is then encoded onto one or more optical beams using the modulator element (119) and the optical transmitter (111). The pen control signals are then transmitted optically from the first end (105) of the tubular body (113) to the second end (107) of the tubular body (113) where the optical beams are detected by the optical receiver (115) and demodulated by the demodulator element (121). The pen control signals are then received by the pen electronics (125) where they are used to control pen operations.

In addition to the transmission of data to the inkjet pen (117), the tubular body (113) may also be used by the pen electronics (125) to send data to the printer control electronics (123). This data may include information such as pen health, pen type installed, pen temperature, etc. Data transmission from pen (117) to controller (123) may co-exist with data transmission from controller (123) to pen (117).

In still other embodiments, the tubular body (113) may be used by the printer control electronics (123) and an ink delivery system (IDS) to communicate with each other, possible concurrently. For example, the printer control electronics (123) may send data to the IDS instructing the system to increase pressure, prime tubes, illuminate diagnostics LED, etc. The IDS may transmit data to the control electronics (123), such as types of supplies installed, ink level remaining, diagnostic info, and/or other pertinent data.

Figure 2:
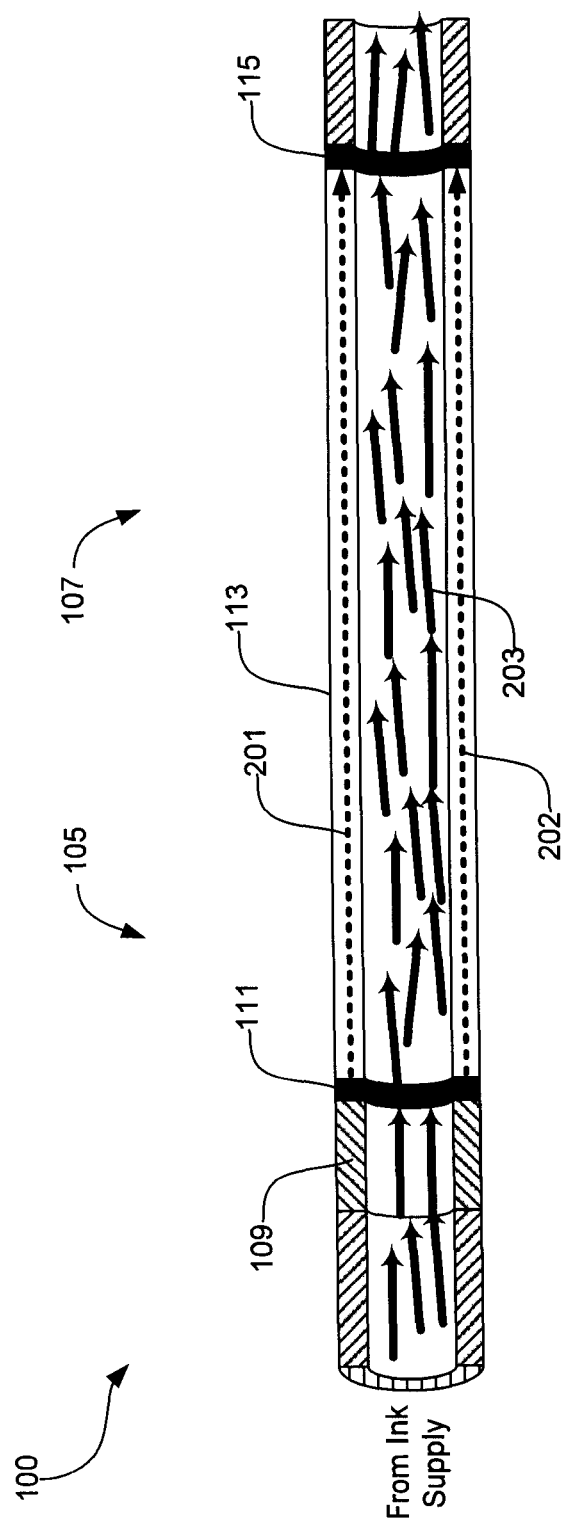
FIG. 2 is a cross-sectional diagram of an illustrative embodiment of a tubular body for ink and data delivery, according to principles described herein.

Referring now to FIG. 2, a cross-sectional view of the system (100) described in relation to FIG. 1 is shown. Illustrative paths (201, 202) of optical energy through the material of the tubular body (113) are shown as dotted lines going from the optical transmitter (111) to the optical receiver (115). While optical energy may undergo numerous internal reflections within the material of the tubular body (113) between the optical transmitter (111) and the optical receiver (115), the illustrative paths (201, 202) are shown as straight paths of average displacement for clarity.

Additionally, the ink pump (109) includes further mechanical components to propel the ink from the ink supply into the tubular body (113). These components have also been removed for clarity, but are readily understood and available in the art. An illustrative ink path is indicated by the arrows (203).

The tubular body (113) is shown here to be straight. However, it will be understood that the tubular body (113) may be flexed or manipulated to follow a nonlinear path as needed to accommodate other components within the interior of a printing device.

Figure 3:
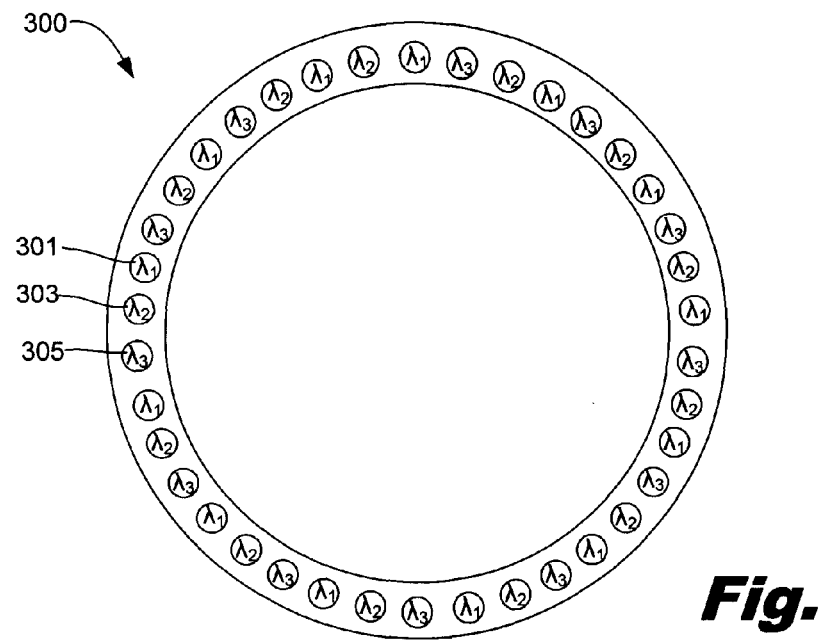
FIG. 3 is a diagram of an illustrative embodiment of an optical transmitter, according to principles described herein.

Referring now to FIG. 3, a diagram of an illustrative embodiment of an optical transmitter (300) is shown. The optical transmitter (300) may be used in conjunction with a tubular body (113, FIG. 1) to transmit data optically through the tubular body (113, FIG. 1) to a corresponding receiver. The optical transmitter (300) has a ring shape with substantially the same cross-sectional area as the tubular body (113, FIG. 1). The optical transmitter (300) includes a plurality of optical sources (301, 303, 305) configured to transmit modulated optical beams directly into the material of the tubular body (113, FIG. 1). Each of the optical sources (301, 303, 305) is configured to transmit optical beams having a specific characteristic wavelength (for example, $\lambda_1$, $\lambda_2$, $\lambda_3$, respectively). Each of the wavelengths (($\lambda_1$, $\lambda_2$, $\lambda_3$) of optical energy may carry a separate channel of data to be transmitted to the optical receiver. In the present example, multiple optical sources (301, 303, 305) are disposed circumferentially about the body and regularly alternate among three different types of optical sources (301, 303, 305) each configured to respectively transmit one of the three indicated wavelengths ($\lambda_1$, $\lambda_2$, $\lambda_3$).

An optical source control line from the modulator element (119) corresponding to the first wavelength ($\lambda_1$) may be in communication with each of the optical sources (301) configured to transmit at the first wavelength ($\lambda_1$). In this way, all of the optical sources (301) configured to transmit optical energy at the first wavelength ($\lambda_1$) may transmit substantially equivalent modulated optical beams concurrently. Similarly, optical sources (303) configured to transmit at the second wavelength ($\lambda_2$) may transmit substantially equivalent modulated optical beams concurrently, and the optical sources (305) configured to transmit at the third wavelength ($\lambda_3$) may also transmit substantially equivalent modulated optical beams concurrently.

Figure 4:
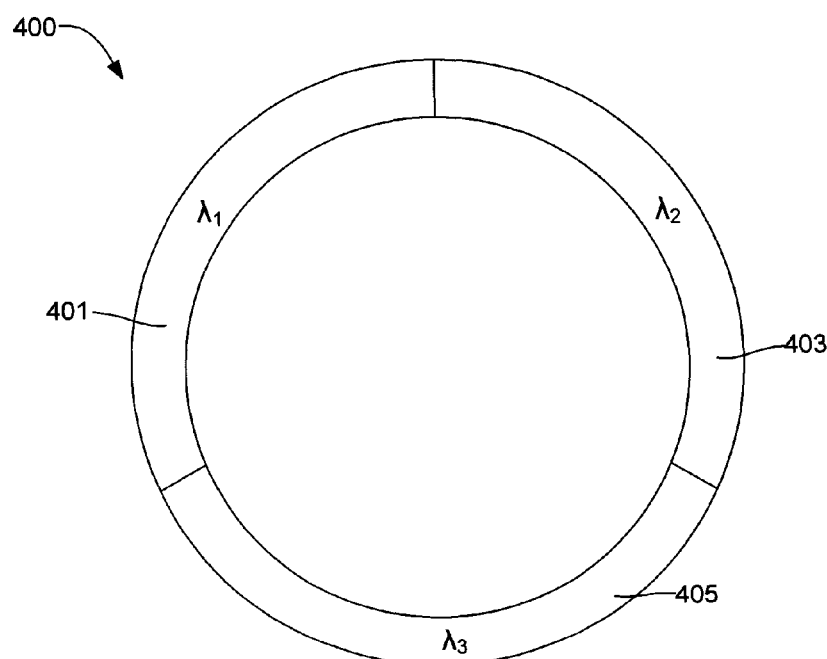
FIG. 4 is a diagram of an illustrative embodiment of an optical transmitter, according to principles described herein.

Referring now to FIG. 4, another illustrative embodiment of a possible optical transmitter (400) is shown. The optical transmitter (400) includes three separate optical sources (401, 403, 405). Each of the optical sources (401, 403, 405) is configured to transmit a modulated optical beam into the tubular body (113, FIG. 1) having a specific characteristic wavelength ($\lambda_1$, $\lambda_2$, $\lambda_3$, respectively).

As will be appreciated by those skilled in the art, while three types of transmitters outputting three different respective wavelengths are shown in the examples of FIGS. 3 and 4, any number of different wavelengths and corresponding transmitters may be used depending on the number of data channels desired. Moreover, different data channels may be differentiated by means other than distinct wavelength. For example, different data channels may be differentiated by beams of different intensity, polarization, etc.

Figure 5:
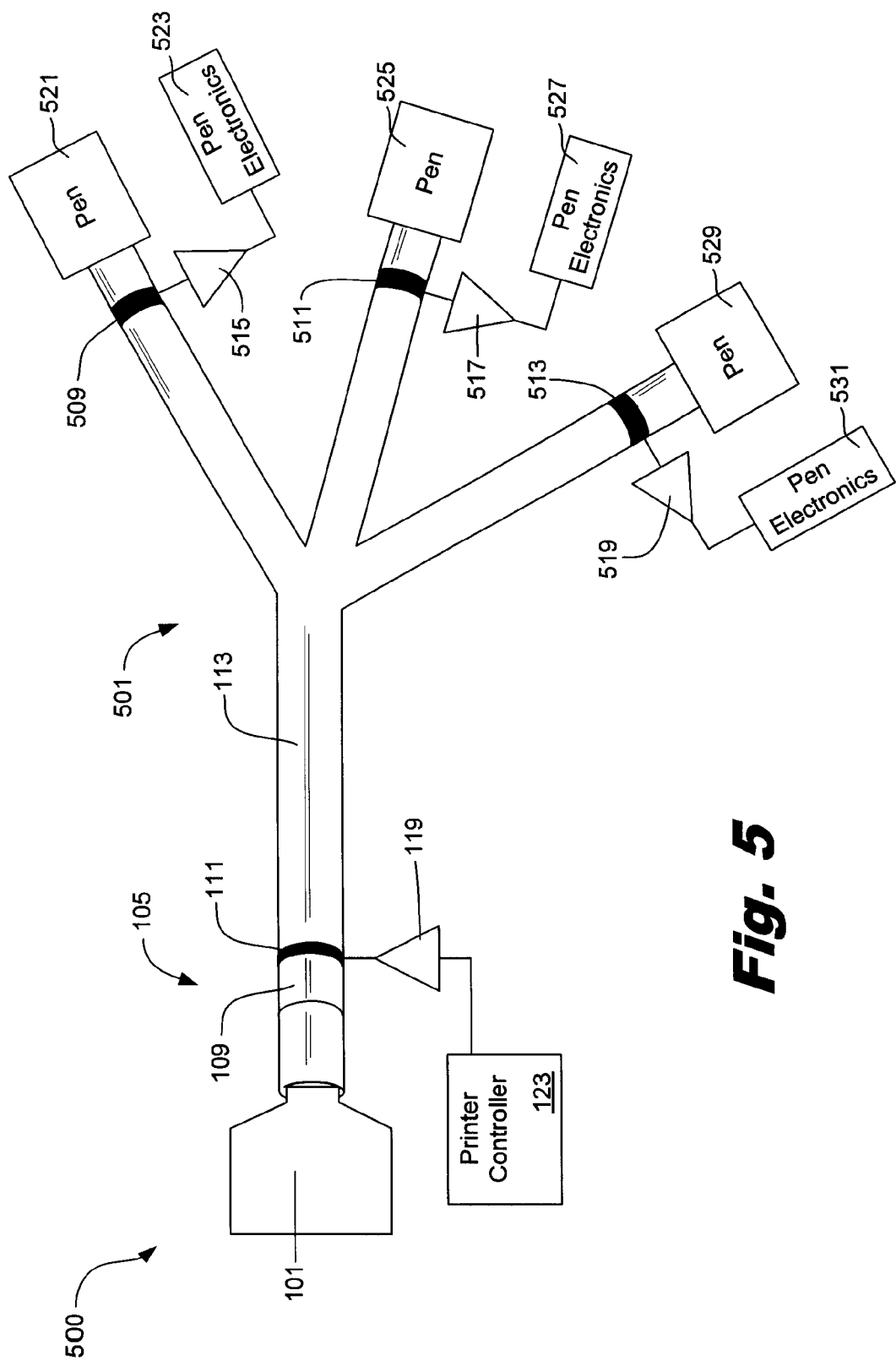
FIG. 5 is a diagram of an illustrative embodiment of a system of ink and data delivery, according to principles described herein.

Referring now to FIG. 5, an illustrative embodiment of a possible system (500) for ink and multi-channel data delivery is shown. The system (500) includes a tubular body (113) configured to receive liquid ink from an ink supply (101) and an ink pump (109) and provide a channel through which the liquid ink may be delivered to a plurality of inkjet pens (521, 525, 529) in a printer.

The tubular body (113) is also configured to route data from printer controller circuitry (123) to pen electronics (523, 527, 531) that control the operation of each of the inkjet pens (521, 525, 529, respectively).

The optical transmitter (111) in the system (500) is configured to transmit multiple channels of optical data into the tubular body (113), which conducts the optical data along its length to individual optical receivers (509, 511, 513) corresponding to the individual inkjet pens (521, 525, 529, respectively). In some embodiments, the optical transmitter (111) is a ring-shaped structure having substantially the same cross-sectional shape and size as the tubular body (113). The optical transmitter may include one or more optical sources, such as LEDs, vertical cavity surface emitting lasers (VCSELs), other lasers, from which the optical beams bearing the data originate.

In some embodiments, the optical transmitter (111) may include a plurality of optical sources, each source being configured to transmit an optical beam of a different characteristic wavelength. By transmitting data from each of the optical sources through the tubular body (113), multiple channels of data may be transmitted through the tubular body (113). In other embodiments, the optical transmitter (111) may include one or more optical sources that are configured to selectively alter the characteristic wavelength of optical beams originating from the sources, thus allowing the sources to transmit optical energy at one characteristic wavelength at a given time, and switch to a separate characteristic wavelength at another time.

In the present example, different channels of optical data may be intended for, and received by, respective optical receivers (509, 511, 513) of different inkjet pens (521, 525, 529, respectively). By transmitting multiple channels of optical data through the tubular body (113), a tubular body (113) that feeds ink from the same supply (101) to different inkjet pens (521, 525, 529) may transmit a separate data channel to electronics (523, 527, 531) in each of the inkjet pens (521, 525, 529).

Each optical receiver (509, 511, 513) is configured to only receive the optical signal of the wavelength corresponding to the data channel for the inkjet pen associated with that optical receiver. For example, optical filters may be present in the receivers (509, 511, 513), corresponding demodulator elements (515, 517, 519), and/or at the split (501) in the tubular body (113). The optical filters may filter out only optical energy transmitted through the tubular body (113) that has a characteristic wavelength corresponding to a data channel intended for a related inkjet pen (521, 525, 529).

Figure 6:
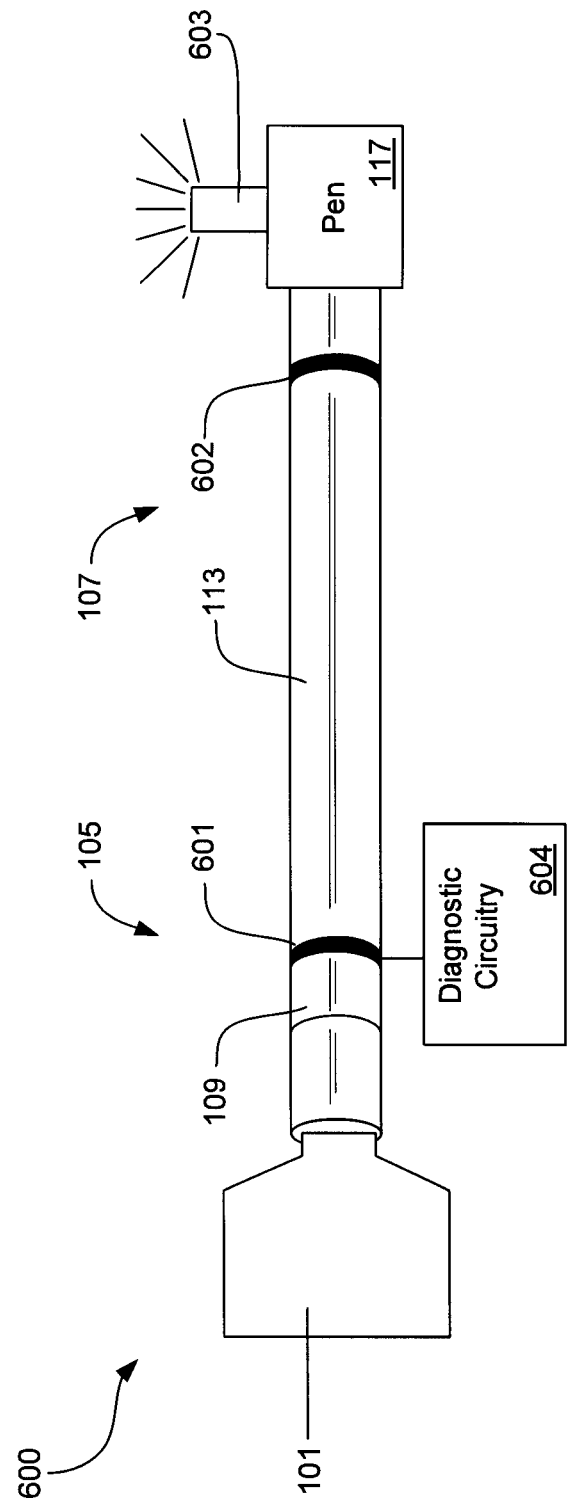
FIG. 6 is a cross-sectional diagram of an illustrative embodiment of a system of ink and data delivery, according to principles described herein.

Referring now to FIG. 6, an illustrative embodiment of a system (600) of having a visual diagnostic indicator on an inkjet pen (117) is displayed. When servicing an inkjet printer, service personnel often must identify a faulty inkjet pen (117) from a group of inkjet pens present in the printing device. In some cases, the printing device may be equipped to identify an inkjet pen (117) that needs servicing to the technician. The present system (600) provides such a visual indicator to service personnel. The system (600) illuminates a visual or an optical indicator (603) on the inkjet pen (117) without requiring that a separate LED or other illuminator be installed in the circuitry of the pen, thus freeing up valuable board real estate in the inkjet pen (117)

The system (600) includes a tubular body (113) that is configured to transport liquid ink from an ink supply (101) to an inkjet pen (117), where the ink may then be selectively applied to a print medium. The tubular body (113) is coupled to an in-line ink pump (109) and an optical source (601) at the first end. At the second end (107), the tubular body (113) includes an optical interface (602) to an internal light pipe and is coupled to the inkjet pen (117).

As described in relation to FIG. 1, the in-line ink pump (109) is coupled to the ink supply (101) and is configured to mechanically force liquid ink from the ink supply (101) into the first end of tubular body (113). By operation of the pump (109), the ink is provided under pressure to the inkjet pen (117) at the second end (107) of the tubular body (113).

The tubular body (113) may be fabricated from a flexible material having optical properties that enable the transmission of light with no significant loss of energy. Upon entering this material that composes the tubular body (113), the index of refraction of the material is such that substantially total internal reflection of the beam occurs, thus enabling the transmission of the optical beam along the length of the tubular body (113) with minimal losses. Many plastic materials having such optical properties are available in the art. Additionally, custom plastics or other materials having desirable optical characteristics for use in the tubular body (113) may be used in some embodiments.

The optical source (601) of this example is configured to transmit a visible optical beam through the tubular body (113) to the optical interface (602) and into the visual indicator (603) which then appears to be lit when examined by service personnel. Diagnostic circuitry (604) is configured to selectively activate at least one LED in the optical source (601) according to diagnostic circuitry in the printing device. For example, the diagnostic circuitry (604) may receive data from at least one sensor in the printing device representative of the health of a particular inkjet pen. When an inkjet pen (117) is performing poorly or experiences a malfunction, the diagnostic circuitry (604) may then selectively activate the LED(s) in the optical source (601) present in the tubular body (113) connected to that particular inkjet pen (117), thereby illuminating the visual indicator (603) of the inkjet pen (117) and enabling service personnel to quickly identify the faulty inkjet pet (117).

The optical interface (602) is configured to route at least a portion of the optical beam received from the tubular body (113) to the optical indicator (603) by way of an internal light pipe between the interface (602) and the visual indicator (603). The visual indicator (603) is optically connected to the internal light pipe and includes a transparent material that allows light exiting from the internal light pipe to shine through the visual indicator (603) so as to be seen from outside of the inkjet pen (117). The visual indicator (603) may be at a readily-visible location on the inkjet pen (117) and is then illuminated by the optical beam from the source (601).

Furthermore, in some embodiments, the optical receiver (602) itself may serve as a visual indicator. For example, portions of the optical receiver (602) may have a low index of refraction on the outer surface relative to that of the tube (113) such that light escapes through the outer periphery of the optical receiver (602). If the optical receiver (602) is near an inkjet pen (117), the optical receiver (602) may be an indicator for that pen (117).

Figure 7:
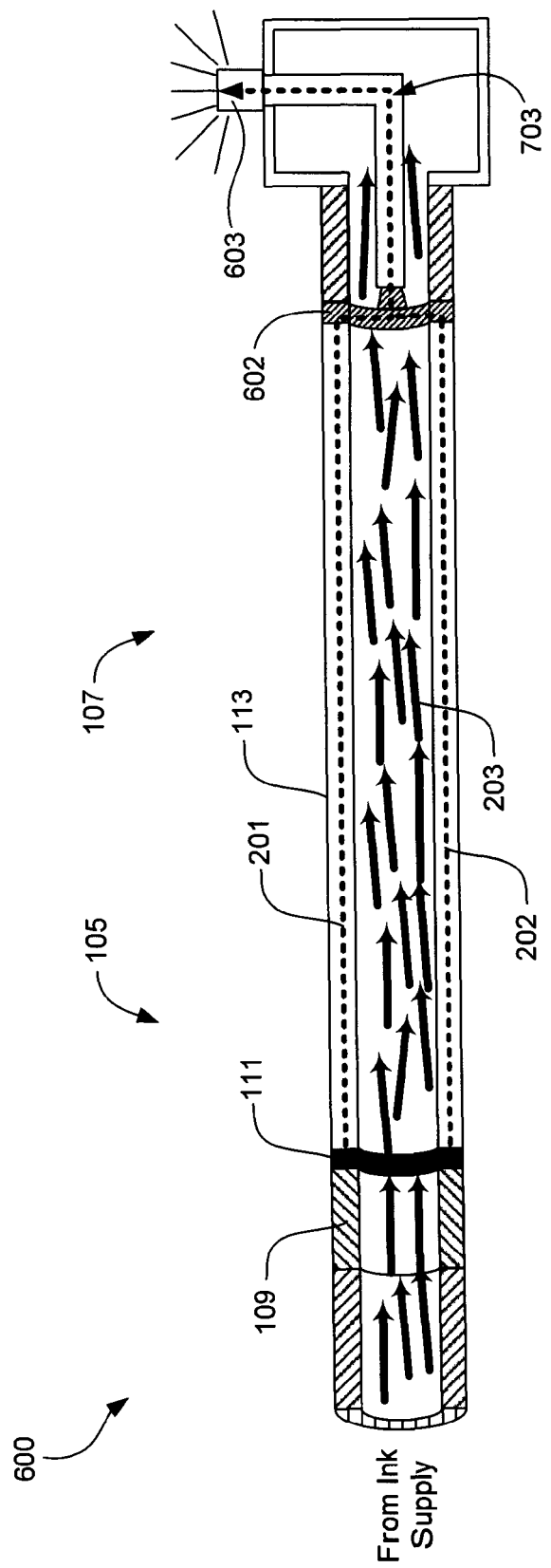
FIG. 7 is a diagram of an illustrative embodiment of a system of ink and data delivery, according to principles described herein.

Referring now to FIG. 7, a cross-sectional view of the system (600) is shown. Similar to the example of FIG. 2, illustrative paths (201, 202) of optical energy through the material of the tubular body (113) are shown as dotted lines going from the optical source (111) to the optical interface (602). In the present example, the optical receiver (602) routes the optical beams from the material of the tubular body (113) into the internal light pipe (703), which may be present inside the channel defined by the tubular body (113). The optical beams are then conducted to the optical indicator (603), which is illuminated by the optical beam.

Figure 8:
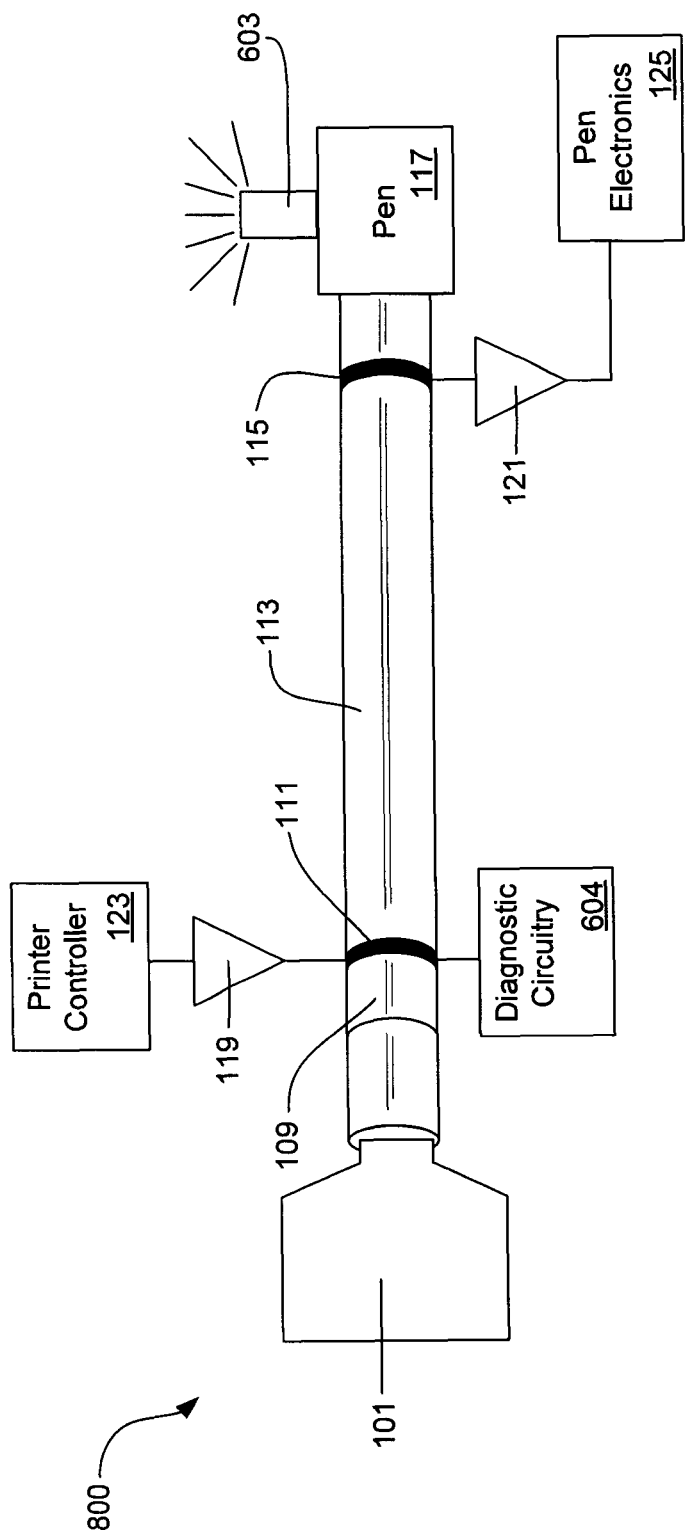
FIG. 8 is a diagram of an illustrative embodiment of a system of ink and data delivery, according to principles described herein.

Referring now to FIG. 8, an illustrative system (800) that provides liquid ink, control data, and a diagnostic indication to an inkjet pen (117) is shown. The present system (800) combines the data transmission and visual diagnostic indicator elements from previously described embodiments. As described previously, the tubular body (113) is configured to transmit multiple channels of optical energy from the optical transmitter (111).

Both diagnostic circuitry (604) and a printer controller module (123) are in communication with the optical transmitter (111). The diagnostic circuitry (604) is configured to control the optical transmitter (111) to emit visible optical energy of a first characteristic wavelength when a malfunction in the pen (117) is detected.

In the present example, the optical receiver (115) includes an optical interface to an internal light pipe and is configured to transmit optical beams having the first characteristic wavelength to a visual indicator (603), as previously described. Optical filters may be used to prevent optical beams of other channels (e.g., wavelengths) from illuminating the visual indicator (603). Thus, when the optical energy of the first characteristic wavelength is transmitted, the optical receiver (115) routes the optical energy to the visual indicator (603) in the inkjet pen (117). Consequently, the visual indicator (603) is illuminated to indicate to service personnel that the pen (117) is malfunctioning.

To transmit data from the printer controller (123) to the pen electronics (125), a second data channel, e.g., a second wavelength of light, is used that will not be passed by the interface (115) into the visual indicator (603). The printer controller module (123) is configured to modulate data into an optical beam having a second characteristic wavelength emitted by the optical transmitter (111). This modulated beam is transmitted to the optical receiver (115) through the material of the tubular body (113). The first and second wavelengths are sufficiently distinct such that the components in the system (800) can distinguish between separate optical beams of the two wavelengths. Thus, light of the second wavelength is transmitted to the demodulator (121). The data from that optical beam is thus retrieved by the demodulator (121) and transmitted to the pen electronics (125).

Consequently, the system (800) can use two different wavelengths to selectively light the visual indicator (603) and transmit control data to the pen electronics (125). An optical signal for either purpose is transmitted through the tube (113) that also serves to deliver liquid ink from the reservoir (101) to the inkjet pen (117). In some embodiments, non-visible wavelengths of light may be used for data transmitted through the tubular body (113) to pen electronics (125), and visible wavelengths of light may be used to illuminate the visual indicator (603). In this manner, the optical receiver (115) need not selectively block light of particular wavelengths.

In other embodiments, data may be transmitted to pen electronics (125) using a light signal with a magnitude, amplitude or intensity that is high enough to be detected by the optical receiver (121), but not high enough to be detected by the human eye at the visual indicator (603). When desired, the visual indicator (603) may be illuminated using a high magnitude light signal.

Figure 9:
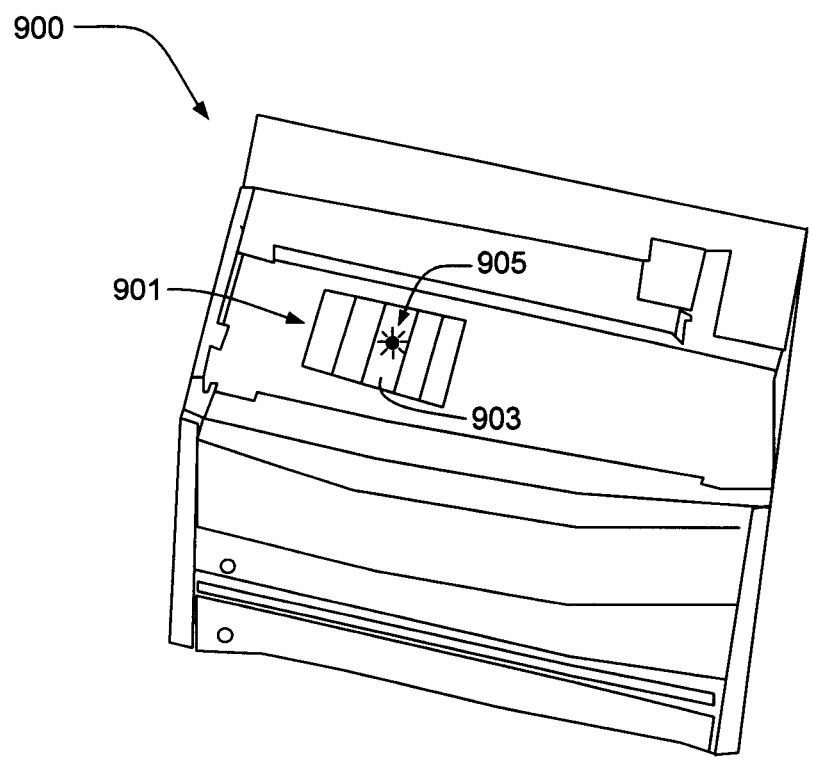
FIG. 9 is a diagram of an illustrative embodiment of a printing device having a diagnostic indicator, according to principles described herein.

Referring now to FIG. 9, an illustrative embodiment of a printing device (900) is shown. The printing device (900) is shown with a diagnostic visual indicator (905) illuminated in an inkjet pen (903). The inkjet pen (903) is one of a group of inkjet pens (901) present in the printing device (900). As mentioned previously, the illuminated visual indicator (905) may help service personnel identify the faulty inkjet pen quickly and efficiently.

Exemplary Methods

Figure 10:
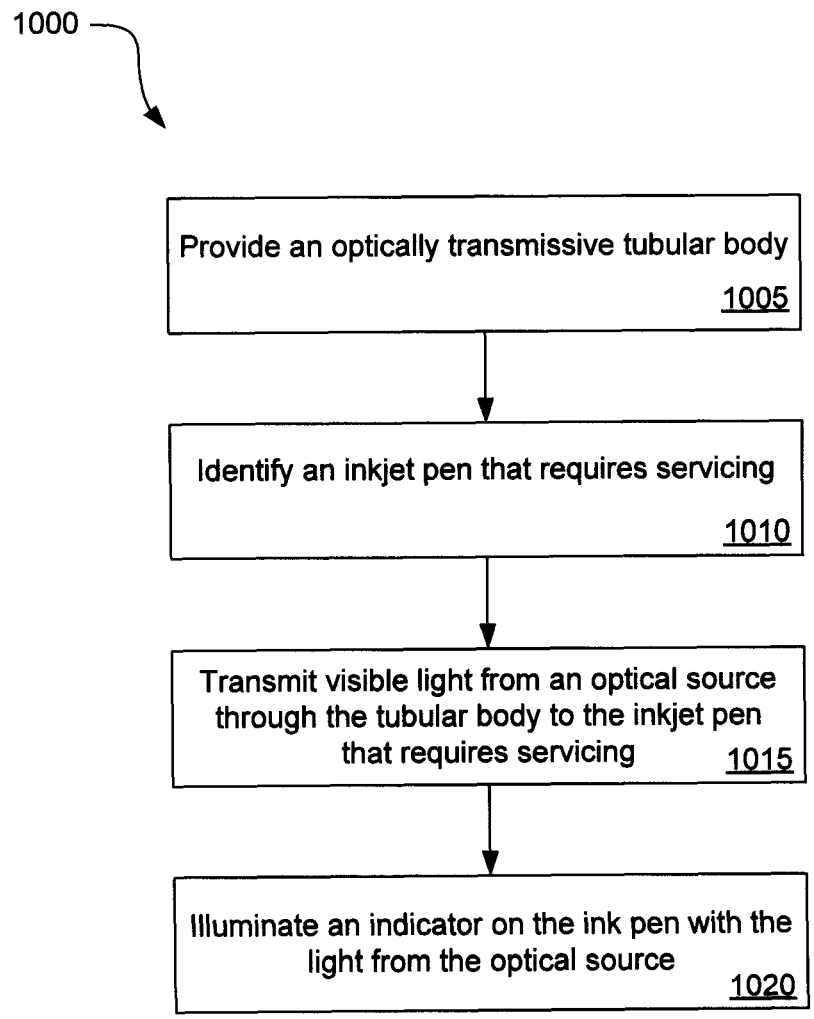
FIG. 10 is a flowchart of an illustrative embodiment of a method of providing a diagnostic indicator, according to principles described herein.

Referring now to FIG. 10, a flowchart of an illustrative embodiment of a method (1000) of diagnostic indication in a printing device is shown. The method includes providing (step 1005) an optically transmissive tubular body between an ink supply and at least one inkjet pen in the printing device. The tubular body is fabricated from a material having sufficient optical properties to sustain total internal reflection of optical energy transmitted into the tubular body.

The method (1000) further includes identifying (step 1010) an inkjet pen that in the printing device that requires servicing. This may be done by evaluating sensor output in diagnostic circuitry. Visible light is then transmitted (step 1015) from an optical source through the tubular body to the inkjet pen that requires servicing. The optical source may have a substantially cylindrical geometry such that the cross-sectional geometries of the tubular body and the optical source may be coupled together and the visible light may be transmitted directly from the optical source into the material of the tubular body.

The visible light may be routed from the tubular body to an internal light pipe in the inkjet pen. A visual indicator on the inkjet pen is then illuminated (step 1020) with the visible light. The optical illuminator may include a transparent material that transmits the light exiting from the internal light pipe outside of the inkjet pen. Additionally, ink may be supplied through the tubular body from an off-axis reservoir to the same inkjet pen.

Figure 11:
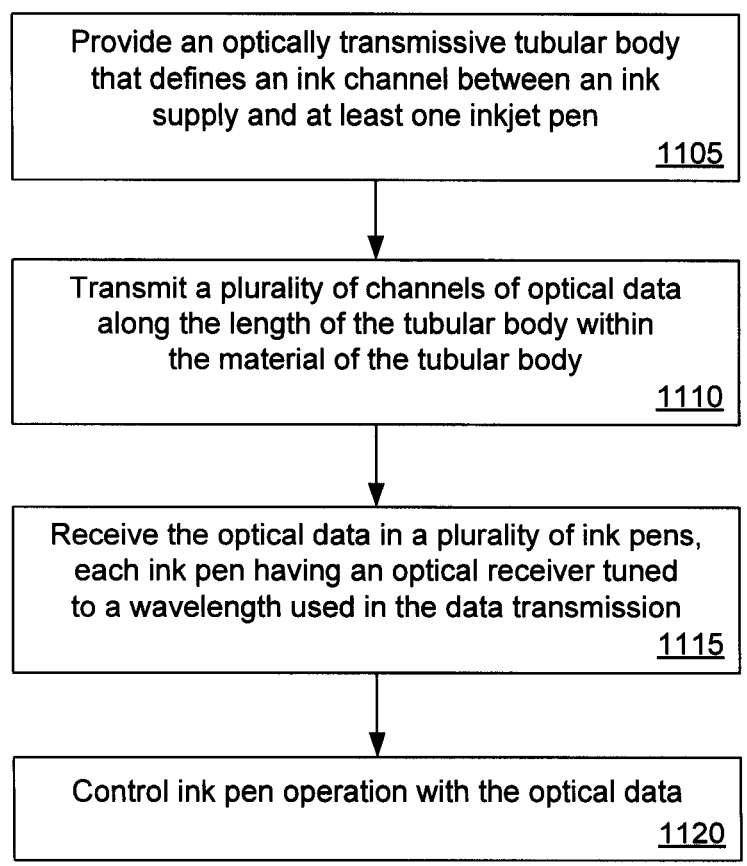
FIG. 11 is a flowchart of an illustrative embodiment of a method of ink and data delivery, according to principles described herein.

Referring now to FIG. 11, a flowchart of an illustrative embodiment of a method (1100) of ink and multi-channel data delivery is shown. The method (1100) includes providing (step 1105) an optically transmissive tubular body that defines an ink channel between an ink supply and at least one inkjet pen. A plurality of channels of optical data are transmitted (step 1110) along the length of the tubular body within the material of the tubular body. The multiple channels may be transmitted over a plurality of wavelengths of optical energy from at least one optical transmitter at one end of the tubular body.

The optical data are then received (step 1115) in a plurality of inkjet pens, with each of the inkjet pens having an optical receiver tuned to a specific wavelength of optical energy used in the data transmission. Thus, in this example, each of the optical receivers is configured to receive a different channel of optical data from the tubular body. The operation of the inkjet pens is then controlled (step 1120) by the data received at the optical receivers corresponding to each of the inkjet pens.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A system of ink and multi-channel data delivery, comprising:

an optically transmissive tubular body having at least two ends, said tubular body defining an ink channel between an ink supply and at least one inkjet pen;

a multi-channel optical transmitter in optical communication with one end of said tubular body; and an optical receiver in optical communication with another end of said tubular body, wherein said channel is configured to feed ink to each of a plurality of inkjet pens disposed at a plurality of ends in said tubular body, and wherein each of said inkjet pens comprises an optical receiver tuned to receive a different channel transmitted by said optical transmitter.

2. The system of claim 1, wherein said optical transmitter is configured to transmit separate channels of optical data using substantially separate wavelengths of optical energy.

3. The system of claim 1, wherein at least one of said optical transmitter and said optical receiver comprises a substantially annular geometry.

4. The system of claim 1, further comprising a data source and a modulator in communication with said optical transmitter and a demodulator and data recipient in communication with said inkjet pen end.

5. The system of claim 4, wherein said data source comprises an inkjet pen controller and said data recipient comprises control circuitry in said inkjet pen.

6. A system of diagnostic indication for an inkjet pen, comprising:

an optically transmissive tubular body having at least two ends, said tubular body defining an ink channel between an ink supply and at least one inkjet pen;

an optical source in optical communication with one end of said tubular body;

an optical indicator in optical communication with another end of said tubular body, wherein said indicator is disposed on said inkjet pen and illuminable by an optical beam transmitted from said optical source; and control circuitry configured to activate said optical source when said inkjet pen is determined to be faulty.

7. The system of claim 6, wherein said tubular body is configured to transmit separate channels of optical energy over substantially separate wavelengths of optical energy.

8. The system of claim 7, further comprising an optical transmitter in optical communication with said tubular body, wherein said transmitter is configured to transmit optical data through said tubular body to an optical receiver corresponding to said inkjet pen.

9. The system of claim 6, further comprising a data source and a modulator in communication with said optical transmitter and a demodulator and data recipient in communication with said inkjet pen end.

10. The system of claim 9, wherein said data source comprises an inkjet pen controller and said data recipient comprises control circuitry in said inkjet pen.

11. The system of claim 6, wherein said inkjet pen comprises a diagnostic sensor configured to detect faulty operation of said inkjet pen.

12. The system of claim 6, wherein said channel is configured to feed ink to each of a plurality of inkjet pens disposed at a plurality of ends in said tubular body.

13. A method of diagnostic indication in a printing device, said method comprising:

providing an optically transmissive tubular body between an ink supply and an inkjet pen in said printing device;

identifying an inkjet pen that requires servicing;

transmitting visible light from an optical source through said tubular body; and illuminating an indicator on said inkjet pen with said visible light received in said inkjet pen through said tubular body.

14. The method of claim 13, wherein said tubular body comprises a material that sustains total internal reflection of optical energy transmitted into the tubular body.

15. The method of claim 13, wherein said method further comprises transmitting said visible light from said tubular body to an internal light pipe in said inkjet pen.

16. The method of claim 15, wherein said optical illuminator comprises a transparent material that transmits said light exiting from said internal light pipe outside of said inkjet pen.

17. The method of claim 13, wherein said identifying an inkjet pen comprises evaluating sensor output in diagnostic circuitry.

18. The method of claim 13, wherein said optical source comprises a substantially cylindrical geometry.

* * * * *